United States Patent [19]
Bell

[11] 3,920,286
[45] Nov. 18, 1975

[54] IDLER RECOIL AND TRACK ADJUSTER SPRING RETENTION ARRANGEMENT, AND METHOD OF ASSEMBLY AND DISASSEMBLY THEREOF

[75] Inventor: Francis D. Bell, Peoria, Ill.

[73] Assignee: Caterpillar Tractor Co., Peoria, Ill.

[22] Filed: Jan. 30, 1975

[21] Appl. No.: 545,447

[52] U.S. Cl. ................................. 305/10; 267/70
[51] Int. Cl.² ....................................... B62D 55/30
[58] Field of Search ............ 305/10, 31; 267/70, 71, 267/72, 135, 175, 177

[56] References Cited
UNITED STATES PATENTS

| | | | |
|---|---|---|---|
| 2,373,125 | 4/1945 | Loepsinger | 267/70 |
| 2,631,031 | 3/1953 | Davis | 267/70 |
| 3,332,725 | 7/1967 | Rewsma | 305/10 |

Primary Examiner—Philip Goodman
Attorney, Agent, or Firm—Phillips, Moore, Weissenberger Lempio & Strabala

[57] ABSTRACT

A spring for providing idler recoil is enclosed within a casing, and a threaded member is adapted for threaded engagement with the casing. With the threaded member in initial threaded engagement with the casing, the spring is allowed to extend to its free length. The spring is then compressed by independent means, and the threaded member is rotated to a position where, with the independent compressing means removed, the spring is in a compressed state. To disassemble such arrangement, the spring is again independently compressed, and the threaded member is rotated to a position where it is still in threaded engagement with the casing, but the spring may be allowed to extend to its free length. The threaded member may then be easily rotatingly removed from the casing.

7 Claims, 3 Drawing Figures

U.S. Patent  Nov. 18, 1975  3,920,286
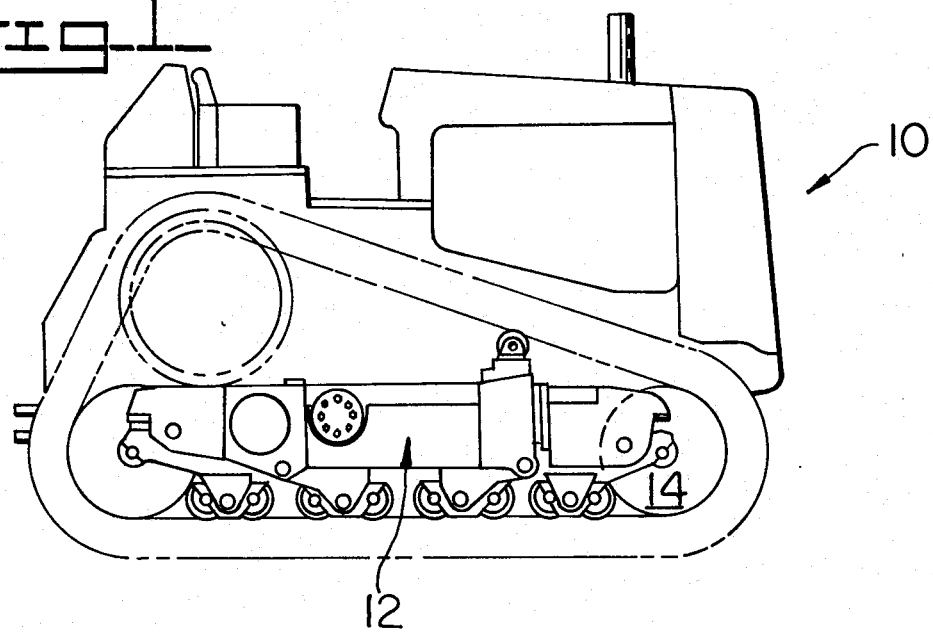
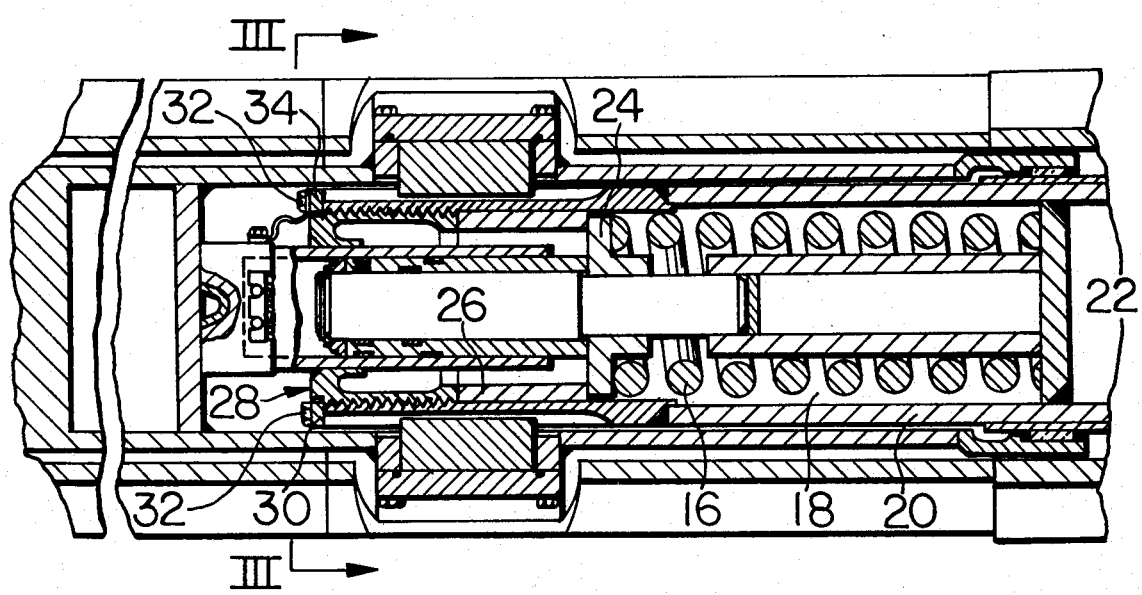
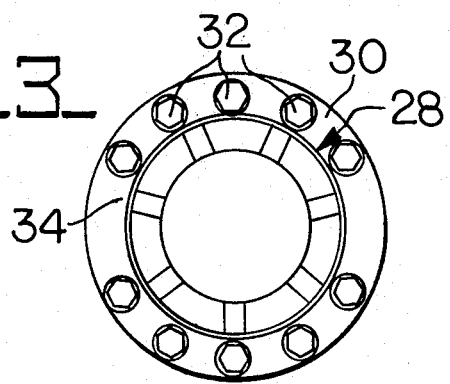

IDLER RECOIL AND TRACK ADJUSTER SPRING RETENTION ARRANGEMENT, AND METHOD OF ASSEMBLY AND DISASSEMBLY THEREOF

BACKGROUND OF THE INVENTION

This invention relates to idler recoil mechanisms, and more particularly, to an idler recoil mechanism which incorporates a spring which may be handled in an extremely safe and efficient manner.

Disclosed in application Ser. No. 507,263, application Ser. No. 507,264, U.S. Pat. No. 3,829,172 (all assigned to the assignee of the present invention), and U.S. Pat. No. 2,818,311 are various systems which incorporate springs for allowing idler recoil in a tractor or the like. In each case, it is to be noted that ring means disposed in appropriate grooves are provided for holding spring means in a compressed state during assembly, disassembly, or operation of the system. While such ring means have been found effective in properly retaining such spring means, it is to be understood that a spring of the type disclosed, in its assembled state, may apply a force of many tons on the spring retaining members. A study of the systems cited above reveals that, if a high degree of care is used in assembling and disassembling the spring retaining means thereof, such systems can be handled in a relatively safe manner. However, it will also be seen that such arrangements, if handled in an appropriate manner by one who is relatively inexperienced, can produce certain dangerous conditions wherein the spring means would be allowed to extend at an inappropriate time, resulting in a potentially hazardous condition.

SUMMARY OF THE INVENTION

It is accordingly an object of this invention to provide a recoil spring arrangement in which the spring means are prevented from undesirably extending from a compressed state thereof.

It is a further object of this invention to provide a recoil spring arrangement which, while fulfilling the above object, provides that the spring means are fully enclosed until the free extended length thereof has been reached.

It is a still further object of this invention to provide a recoil spring arrangement which, while fulfilling the above objects, is extremely simple in design and use.

It is also an object of this invention to provide a method of assembling and disassembling a spring retention arrangement, which method is practiced in an extremely safe and efficient manner.

Broadly stated, the invention comprises a spring arrangement comprising a casing within which the spring is positioned, and having a wall portion against which one end of the spring is positionable. A threaded member is adapted for threaded engagement with the casing adjacent an end thereof, and is movable upon rotation thereof relative to the casing toward and away from the wall portion to first and second positions, relatively further from and nearer to the wall portion respectively, with the threaded member being in threaded engagement with the casing in said first and second positions. Means are associated with the threaded member for providing that, with the threaded member in its second position, the spring is in a compressed state, and with the threaded member in its first position, the spring is fully extended to its free length.

Also broadly stated, the invention comprises a method of assembling a spring retention arrangement comprising installing the spring within a casing, threadably installing a threaded member in a first position relative to the casing, allowing the spring to adopt its free length without compressive force thereof, compressing the spring within the casing against a casing wall independent of the threaded member, rotating the threaded member into a second position towards the casing wall, and releasing the independent compression of the spring, the spring in such state being compressed to apply force to the end wall and threaded member with the threaded member in said second position.

BRIEF DESCRIPTION OF THE DRAWINGS

These and other objects of the invention will become apparent from a study of the following specification and drawings, in which:

FIG. 1 is a side elevation of a vehicle incorporating the invention;

FIG. 2 is a sectional view of the idler recoil arrangement of the apparatus of FIG. 1; and FIG. 3 is a view taken along the line III—III of FIG. 2.

DESCRIPTION OF THE PREFERRED EMBODIMENT

Shown in FIG. 1 is a vehicle 10 incorporating a recoil system 12 for an idler 14 of the vehicle 10. The recoil system 12 is shown in detail in FIG. 2, and is designed and operated substantially in accordance with the system disclosed in application Ser. No. 507,263 (assigned to the assignee of the present invention), and reference is made to such application for a complete understanding of the operation of such recoil system in its assembled state.

In the present invention, the spring 16 in the operating state shown in FIG. 2 is loaded to an extent of approximately 63,500 pounds, and it will be understood that such spring 16 must not only be retained in operating condition in a safe manner, but must be capable of being handled during assembly and disassembly of the apparatus in an extremely safe manner, as the sudden undesirable extension of such a spring could cause great injury and damage.

In the assembly of such a spring retention arrangement as shown in FIG. 2, the spring 16 is inserted within a cavity 18 of a casing 20, and such spring 16 is positioned so that one end thereof may contact a wall portion 22 of the casing 20. A collar 24 is then inserted to abut the opposite end of the spring 16. Subsequently, a sleeve 26 is inserted within the casing 20 as shown, and an externally threaded member 28 is threadably engaged with the casing 20 by means of internal threads defined by the casing 20, adjacent an end of the casing 20. The threaded member 28 is movable upon rotation thereof relative to the casing 20 toward and away from the wall portion 22. The free length of the spring 16 and the dimensions of the other parts associated therewith are such that the threaded member 28 can adopt a first position wherein it is in threaded engagement with the casing 20, but with the spring 16 still allowed to adopt its free, fully extended length. That is, no compressive force is placed on the spring 16 in such state.

At such point, spring 16 is compressed by means of a service tool ram or the like of well known type (not shown) bearing against the collar 24. Such service tool ram of course acts independently of the threaded member 28 in compressing the spring 16 against the casing wall portion 22. Upon achievement of such state, the threaded member 28 is completely installed by hand by means of rotation thereof relative to the casing 20, or with a standard type wrench, into a second position toward the casing wall portion 22, as shown in FIG. 2. A safety ring 30 is then bolted to the end of the casing 20 by a plurality of bolts 32. The inner ring portion 34 of the safety ring 30 is positioned to contact the threaded member 28, and the threaded member 28 may be backed out slightly, meanwhile generally retaining its second position, until it contacts the ring portion 34 of the safety ring 30. The means described above for independently compressing the spring 16 may then be gradually released until the collar 24 engages the sleeve 26 which in turn contacts the threaded member 28. In such state, and with the threaded member 28 in such generally second position, the spring is in a compressed state, applying force to the wall portion 22 and threaded member 28. Because of the contacting of the threaded member 28 and the ring portion 34, a portion of the force applied to the threaded member 28 by the spring 16 is transferred to the ring 30 and to the casing 20.

It is to be noted that, during such assembly, the threaded member 28 is in a partially installed state, and is threadably engaged with the casing 20, even with the spring 16 at its free length. Such state insures that, if the ram press used to independently compress the spring 16 should fail, the spring 16 is completely enclosed and cannot escape to cause damage.

Also in such state, with the safety ring 30 removed, spring force applied to the threaded member 28 by the spring 16 forces the threaded portions of the threaded member 28 and casing 20 together in a manner sufficient to prevent disassembly of the threaded member 28 from the casing 20 without first compressing the spring 16 by the independent means described above.

To complete the assembly, the remaining components of the hydraulic cylinder system of application Ser. No. 507,263 are then installed.

During disassembly, appropriate parts of application Ser. No. 507,263 are removed, and, as pointed out above, removal of the threaded member 28 from the casing 20 is prevented without first relieving the force of spring 16 by a ram or other such device, because of the high load on the threaded portions of the threaded member 28 and casing 20. Upon such independent compression of the spring 16 within the casing 20, against the casing wall portion 22, with the threaded member 28 remaining generally in a second position as shown in FIG. 2, the threaded member 28 may subsequently be rotated from its generally second position into its first position away from the casing wall portion 22. The independent compressive force applied to the spring 16 may then be released, to allow the spring 16 to adopt its free length without compressive force thereon. The threaded member 28 may then be rotated to remove it from the casing 20.

What is claimed is:

1. A spring retention arrangement comprising:
    a casing within which the spring is positioned, and having a wall portion against which one end of the spring is positionable;
    a threaded member adapted for threaded engagement with the casing adjacent an end thereof, and movable upon rotation thereof relative to the casing toward and away from the wall portion to first and second positions, relatively further from and nearer to the wall portion respectively, with the threaded member being in threaded engagement with the casing in said first and second positions; and
    means associated with the threaded member for providing that, with the threaded member in its second position, the spring is in a compressed state, and with the threaded member in its first position the spring is fully extended to its free length.

2. The spring retention arrangement of claim 1 wherein the threaded member comprises an externally threaded member threadably engaged with internal threads defined by the casing.

3. The spring retention arrangement of claim 1 and comprising ring means securable to the casing and having a ring portion positioned to contact the threaded member so that a portion of the spring force placed on the threaded member with said threaded member generally in said second position is transferred to the ring means and to the casing.

4. The spring retention arrangement of claim 3 wherein the threaded member comprises an externally threaded member threadably engaged with internal threads defined by the casing.

5. A method of assembling a spring retention arrangement comprising:
    installing a spring within a casing;
    threadably installing a threaded member on the casing in a first position relative to the casing, allowing the spring to remain at its free length without compressive force thereon;
    compressing the spring within the casing against a casing wall independently of the threaded member;
    rotating the threaded member into a second position toward the casing wall; and
    releasing the independent compression of the spring, the spring in such state being compressed to apply force to the end wall and threaded member with the threaded member in said second position.

6. The method of claim 5 and further comprising disassembling the spring retention arrangement comprising:
    independently compressing the spring within the casing against the casing wall with the threaded member in its second position;
    rotating the threaded member from its second into its first position away from the casing wall;
    releasing the independent compression of the spring to allow the spring to adopt its free length without compressive force thereon, and
    rotating the threaded member to remove said threaded member from the casing.

7. The method of claim 5 and further comprising the step of securing ring means to the casing to contact the threaded member with the threaded member generally in its second position, so that a portion of the force applied to the threaded member by the spring is transferred to the ring means and to the casing.

* * * * *